United States Patent Office 3,402,855
Patented Sept. 24, 1968

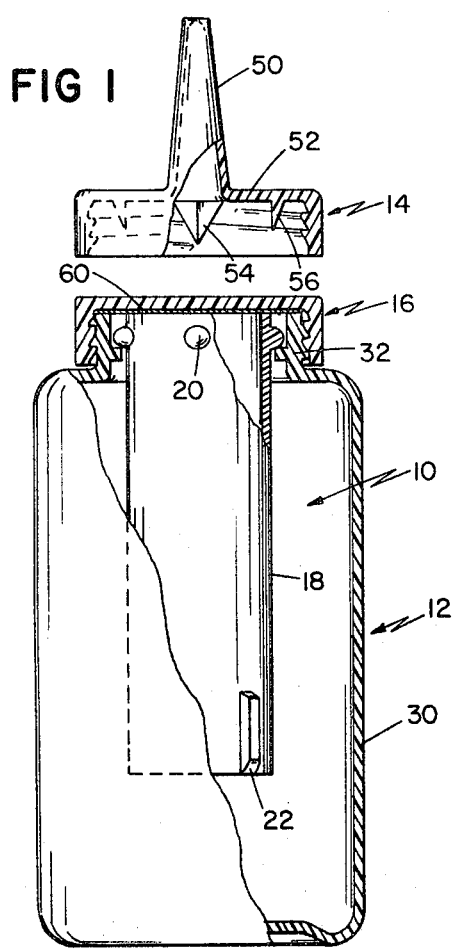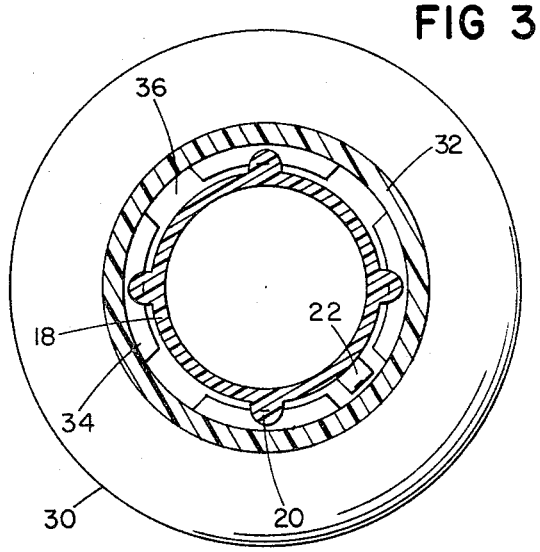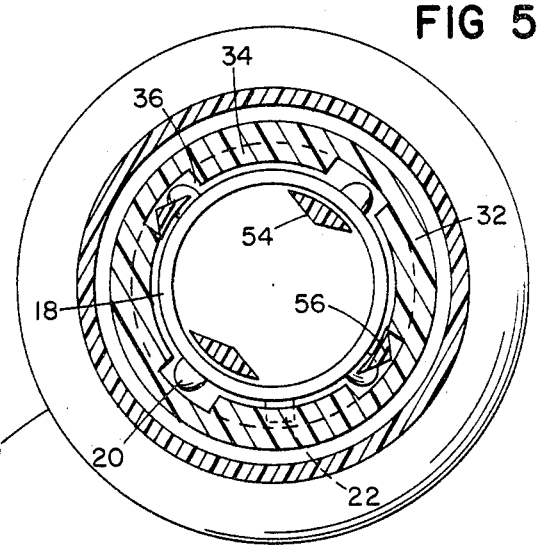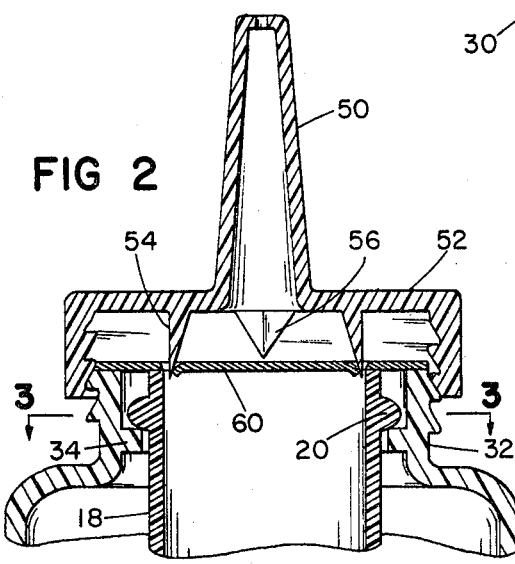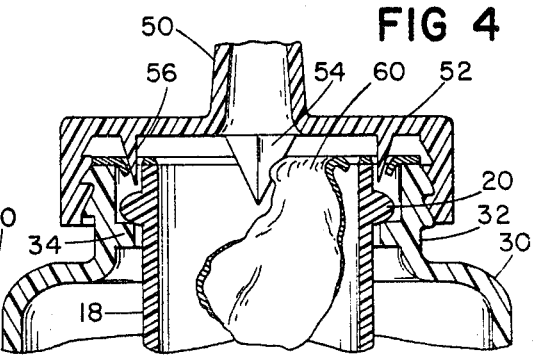

3,402,855
MIXING CONTAINER
George A. Schroeder, Addison, and Harold E. Pearson, Chicago, Ill., assignors to The Gillette Company, Boston, Mass., a corporation of Delaware
Filed May 16, 1967, Ser. No. 638,816
9 Claims. (Cl. 222—83)

A device for mixing ingredients comprising an inner container supported within an outer container so that their mouths are coplanar and sealed, a rupturing element to open the seal and place the inner container in a position where it may be movable within the outer container. The rupturing element in a preferred embodiment is a screw cap with a delivery spout and projecting elements which rupture the seal and move the inner container by engaging nibs projecting from the inner container and moving them until they line up with openings in the lands projecting from the outer container, on which lands the nibs rest in the sealed position, so that the inner container may fall to the bottom of the outer container. A closure cap may be provided to protect the seal during shipment and storage.

---

This invention relates to the storage, mixing and dispensing of liquids and/or solids by means of a two compartment device.

A variety of compositions including some types of cosmetics and hair dyes are unstable and must be used within a short time after mixing of the ingredients, making it impossible to package and distribute the composition in the usual manner through trade channels because of the relatively long period of time, usually weeks or months, between packaging and use by the ultimate consumer. In most cases this difficulty can be met by maintaining certain active ingredients separate from the remainder of the composition and instructing the ultimate user to carry out the final mixing step immediately before use. It has been proposed to mount one container within the other, sealing the inner one by means of a screw cap rotatable through the wall of the outer container, so that the inner container can be opened while retained within the outer, permitting the contents of the two to mix, as described in Modderno U.S. Patent 3,255,926. However, this construction requires a seal for the rotatable element projecting through the wall, which seal is subject to the possibility of leakage, as well as a separate screw cap seal for the mouth of the inner container. In addition, since the rotatable member is accessible during storage, there is the possibility of premature opening of the inner container by accident or by the hands of inquisitive children.

One object of the present invention is to provide a double container in which no movable parts project outside of the container during storage, obviating the possibility of premature opening and mixing of contents and making it possible to employ a single sealing element for sealing both containers.

Another object of the invention is to provide for storage, mixing and dispensing of ingredients of a composition in a simple, reliable, and inexpensive way.

The invention features an inner container nested in spaced relation inside an outer container, and includes means within the outer container for releasably supporting the inner container with its mouth approximately coplanar with the mouth of the outer, a rupturable closure extending across and in sealing engagement with the mouths of both containers, and means which can be engaged with the device to rupture the closure and to release the supporting means so as to open the mouths of both containers and permit the inner one to move within the outer when the device is shaken in order to mix the contents of the two containers.

The rupturing means may be in the form of a screw cap rotatably mountable on the mouth of the outer container and having a delivery spout as well as projecting elements which serve to rupture the closure, which may be in the form of a membrane such as metal foil, both within the mouth of the inner container and in the intermediate portion between the mouths of the containers to free the containers for rotation of one with respect to the other while maintaining their mouths approximately coplanar. A protective closure screw cap may also be provided to cover and protect the membrane closure during shipment and storage, this cap being removable and interchangeable with or replaceable by the cap used for rupturing the membrane.

In a preferred embodiment the supporting means is in the form of a set of laterally projecting elements extending outwardly from spaced locations on the inner container and a second set of elements extending inwardly from spaced locations on the outer container. The elements are arranged so that the first set overlies and rests on the second to support the inner container above the bottom of the outer when the two containers are properly positioned with respect to each other with their mouths approximately coplanar; when the two containers are rotated with respect to each other, however, a second position is reached in which the projecting elements of each set are free to pass through the spaces between the elements of the other set to permit the inner container to drop to the bottom of the other and to allow the contents of the two containers to be mixed. The screw cap carrying the membrane rupturing elements may be arranged to engage the inner container and to rotate it from the first to the second position after the intermediate portion of the membrane has been ruptured.

Other objects, features, and advantages will appear from the following description of a preferred embodiment of the invention, taken together with the attached drawings thereof, in which:

FIG. 1 is a side view, partially in section, of a preferred embodiment of the invention showing the protective closure cap mounted on the device and the membrane-rupturing delivery cap separated from the device;

FIG. 2 is a view in vertical section of a portion of the preferred embodiment in which the delivery screw cap has begun to be screwed on;

FIG. 3 is a cross-sectional view along the lines 3—3 of FIG. 2;

FIG. 4 is a sectional view similar to FIG. 2 except that the cap has been screwed on so that it is further down the neck of the container; and FIG. 5 is a cross-sectional view similar to FIG. 3 showing the device after the containers have been rotated to a position permitting the inner container to drop to the bottom of the outer.

The drawings show a device having an inner container (indicated generally at 10), an outer container (indicated generally at 12), a delivery screw cap (indicated generally at 14), and a closure screw cap (indicated generally at 16).

The inner container 10 has a generally cylindrical wall 18 and projections or nibs 20 extending outwardly from the wall near its top. It may be made of plastic or of metal. If made of metal it may be resin coated in manners well known in the packaging art, when used in the packaging of compositions which might be potentially corrosive. The nibs 20 are four in number and are spaced equally from each other around the inner container circumference. Near the bottom of the inner container 10, on the outside of the wall 18 is an indexing lug 22. The indexing lug 22 occupies a position on the circumference of the inner container 10 equidistant between the positions occupied by two of the nibs 20.

The outer container 12 is larger and longer than the inner container 10. It is preferably squeezable. Like the inner container 10, it may be made of plastic or metal (resin coated metal if necessary). In order to be squeezable, if metal is used it would be preferred to use a thin flexible material such as aluminum. The outer container has a generally cylindrical wall 30 and an outwardly threaded neck 32. Extending inwardly from the neck 32 are four projections or lands 34 with openings 36 between their ends. The openings 36 are spaced equally from each other and are large enough for the nibs 20 to pass through. Similarly, the spaces between nibs 20 are large enough to permit passage of the lands 34.

An ordinary plastic closure screw cap 16 is shown in FIG. 1 as screwed on the outer container neck 32, as may be desired to protect the device during shipment prior to use.

The tops of the inner 10 and outer 12 containers lie in the same plane. A flat membrane 60 of metal foil seals both of them, being adhesively secured along the periphery of the mouth of each container.

Plastic delivery screw cap 14 has a delivery nozzle or spout 50 and, extending downwardly from the base 52 of the cap, projecting cutters capable of rupturing the membrane. There are four cutters, two deep cutters 54 and two shorter cutters 56. Viewed from the center of the cap base 52, the cutters 54 and 56 are triangular in shape, with the apex of the triangle pointing down. Viewed from the top of the cap the cutters are relatively thin, tapering to a cutting edge which slopes downwardly.

The deeper cutters 54 extend about two-thirds of the height of the threaded portion of the cap 14. The shorter cutters 56 extend about one-half of the height. There are two deeper cutters 54 located opposite each other and radially inward from the wall 18 of the inner container within its mouth (as seen in FIG. 2). There are two shorter cutters 56 located opposite each other, equidistant from the deeper cutters 54, and radially inward from the neck 32 of the outer container 12 but radially outward from the wall 18 of the inner container (as seen in FIG. 4).

In assembling, different liquids or solutions which will be mixed later are placed in the inner 10 and outer 12 containers. Since the index lug 22 is out of line with the nibs 20, if the inner container 10 is dropped straight down into the outer container 12 after the index lug 22 is lined up with one of the land openings 36, the nibs 20 will rest on the lands 34 with the mouths of the two containers approximately coplanar. The metal foil membrane 60 is then adhered to the peripheries of the mouths of both containers to seal them so that the liquid in the outer container cannot mix with the liquid in the inner container.

The metal foil membrane 60 also prevents rotation or movement of the containers relative to each other during storage or shipment. The optional closure screw cap 16 protects the membrane 60 and ensures a tight seal.

When it is desired to mix the contents of the containers, the ordinary closure cap 16 is replaced by the delivery screw cap 14. As the delivery cap 14 is screwed on, the rotary and downward motion of the deeper cutters 54 causes them to rupture the membrane 60 just inside the inner container wall 18 (see FIG. 2). As the cap 14 is further screwed on the shorter cutters 56 similarly rupture the intermediate portion of the membrane 60 just inside the neck 32 of the outer container 12 and between the mouths of the two containers (see FIG. 4). Further screwing on of the cap causes the shorter cutters 56 to come into contact with the nibs 20 and move them in a circumferential direction until they line up with the land openings 36, rotating the inner container 10 with respect to outer container 12, whereupon gravity causes the inner container 10 to fall into the outer container 12. Shaking the device causes the liquids to be mixed together and the delivery spout or nozzle 50 allows dispensing of the mixed liquids.

Other embodiments will occur to those skilled in the art and are within the following claims.

What is claimed is:

1. A device for storage, mixing and dispensing of ingredients comprising
   two containers nested in spaced relationship one within the other, each container having a mouth,
   means within said device for releasably supporting the inner container with its mouth approximately coplanar with the mouth of the outer,
   a rupturable closure extending across and in sealing engagement with the mouths of both containers,
   and means engageable with said device for rupturing said closure to open the mouths of both containers including means for releasing said supporting means to permit the inner container to move within the outer when the device is shaken to mix the contents of the two containers.

2. A device as claimed in claim 1 in which said closure comprises a membrane and comprising in addition
   a protective closure cap releasably engageable with the outer container and covering said membrane,
   said cap being interchangeable with said rupturing means.

3. A device as claimed in claim 1 in which said rupturing means includes a delivery spout for delivering the contents of the two containers.

4. A device as claimed in claim 1 in which said supporting means is releasable by rotation of one container with respect to the other while their mouths are maintained approximately coplanar,
   and in which the intermediate portion of the closure extending from the mouth of one container to the mouth of the other prevents said rotation.

5. A device as claimed in claim 4 in which said rupturing means comprises means for first rupturing said closure within the mouth of the inner container and for subsequently rupturing said intermediate portion of the closure.

6. A device as claimed in claim 1 in which said inner container is shorter than the outer and said supporting means comprises a first set of laterally projecting elements extending outwardly from spaced locations on said inner container, a second set of projecting elements extending inwardly from spaced locations on said outer container, said first set overlying the second set in one position of the containers to support the inner container in spaced relation above the bottom of the outer, and the elements of each set passing through the spaces between elements of the other set in a second position of the containers to permit the inner container to drop to the bottom of the outer, said containers being movable from first to second position by rotation of one container with respect to the other while their mouths are maintained approximately coplanar, and in which said releasing means comprises means for moving the containers from first to second positions.

7. A device as claimed in claim 6
   in which said closure comprises a membrane,
   in which the intermediate portion of said membrane extending from the mouth of one container to the mouth of the other prevents rotation of one container with respect to the other and
   in which said rupturing means comprises a delivery cap rotatably mountable on the mouth of the outer container and having a delivery spout,
   said cap having at least one element projecting from it in position to rupture the membrane within the mouth of the inner container when the cap is mounted, said cap having at least one other element projecting from it in position to rupture the intermediate portion of the membrane to free said containers for said rotation and including means for engaging said inner container to cause it to rotate with said cap with respect to the outer container from first to second position.

8. A device as claimed in claim 7 comprising in addition a protective closure cap rotatably mountable on the mouth of the outer container, over said membrane, said closure cap being removable and interchangeable with said delivery cap.

9. A device for the storage, mixing and dispensing of liquids, comprising:

an outer container with a neck threaded on the outside, said neck having inwardly extending lands with openings between their ends;

an inner container shorter than the outer container, said inner container having an outside diameter smaller than the inside diameter of said lands, said inner container having outwardly extending nibs near its top, said nibs being small enough to pass through said land openings and being spaced to correspond to said land openings, said nibs resting on said lands;

a membrane sealing the mouths of both containers;

a closure screw cap adapted to fit said outer container's threaded neck;

a liquid delivery screw cap adapted to fit said outer container's threaded neck and interchangeable with said closure cap, said delivery cap having downwardly projecting deep cutters and shorter cutters, said deep cutters being adapted to rupture said membrane inside the periphery of said inner container as said dispensing cap is first screwed on said outer container's threaded neck, said shorter cutters adapted to cut the intermediate portion of said membrane between the mouths of said containers as said dispensing cap is further screwed on said neck and being adapted to abut against said nibs as said dispensing cap is even further screwed on to rotate the inner container until said nibs line up with said land openings to permit said inner container to drop to the bottom of said outer container.

References Cited

UNITED STATES PATENTS

| | | | |
|---|---|---|---|
| 2,073,273 | 3/1937 | Wetstein | 206—474 X |
| 3,318,484 | 5/1967 | Modderno | 206—474 X |
| 3,255,926 | 6/1966 | Modderno | 222—142.5 X |
| 3,339,802 | 9/1967 | Weiner et al. | 206—474 X |

ROBERT B. REEVES, *Primary Examiner.*

N. L. STACK, *Assistant Examiner.*